United States Patent
Planeta

[11] Patent Number: 5,912,021
[45] Date of Patent: Jun. 15, 1999

[54] COLLAPSING FRAME FOR MOVING TUBES OF PLASTIC MATERIAL

[76] Inventor: Mirek Planeta, 170 Traders Blvd., Mississauga, Ontario, L4Z 1W7, Canada

[21] Appl. No.: 08/162,920

[22] Filed: Dec. 8, 1993

Related U.S. Application Data

[63] Continuation of application No. 07/945,781, Sep. 16, 1992, abandoned.

[51] Int. Cl.$^6$ .................................................. B29C 53/20
[52] U.S. Cl. .................. 425/72.1; 425/326.1; 425/387.1
[58] Field of Search ................................ 425/72.1, 326.1, 425/387.1, DIG. 235; 264/175, 566

[56] References Cited

U.S. PATENT DOCUMENTS

| | | | |
|---|---|---|---|
| 3,034,848 | 5/1962 | King ................................... | 264/175 X |
| 3,223,762 | 12/1965 | Fry, Jr. ............................... | 264/566 X |
| 3,576,051 | 4/1971 | Click et al. ......................... | 425/72.1 |
| 3,749,540 | 7/1973 | Upmeier ............................. | 425/72.1 X |
| 3,950,466 | 4/1976 | Hasler ................................ | 425/72.1 X |
| 3,980,418 | 9/1976 | Schott, Jr. ........................... | 425/72.1 |
| 4,279,580 | 7/1981 | Hayashi et al. ..................... | 425/72.1 |
| 4,533,309 | 8/1985 | Planeta ............................... | 425/326.1 |
| 4,615,666 | 10/1986 | Steinberg ........................... | 425/326.1 X |

FOREIGN PATENT DOCUMENTS

| | | | |
|---|---|---|---|
| 207171 | 12/1956 | Australia ............................. | 264/566 |

*Primary Examiner*—Richard L. Chiesa
*Attorney, Agent, or Firm*—Rogers & Scott

[57] ABSTRACT

A collapsing frame for collapsing a moving tube of plastic material from a circular cross section to a flattened form has a pair of frame members positionable on diametrically opposite sides of the tube to converge towards each other in the direction of movement of the tube so as to collapse the tube by engagement of the tube therewith. Each frame member has mounted thereon for engagement by the tube a series of longitudinally spaced roller assemblies mounted for free rotation about axes substantially transverse to the direction of movement of the tube. Each roller assembly comprises at least one rotatable roller having a peripheral surface oriented to tend to move the tube at an outwardly inclined angle to the direction of movement of the tube.

2 Claims, 2 Drawing Sheets

COLLAPSING FRAME FOR MOVING TUBES OF PLASTIC MATERIAL

This is a continuation of U.S. patent application Ser. No. 07/945,781 filed Sept. 16, 1992, now abandoned.

FIELD OF THE INVENTION

This invention relates to collapsing frames for moving tubes of plastic material.

DESCRIPTION OF THE PRIOR ART

When thin plastic film is extruded in the form of a tube, which is then frequently expanded to produce thinner tube by feeding air under pressure to the interior of the tube, the tube is subsequently collapsed to a flattened form to enable it to be more readily handled, for example for feeding the tube to a storage roll or bag-making machine.

The tube is usually collapsed from a circular cross-section to a flattened form by feeding the tube through a collapsing frame comprising two frame members which are inclined symmetrically and oppositely towards the tube in the direction of travel thereof to provide a gradually narrowing passage between the frame members from which the collapsing tube is fed to the nip of a pair of rollers which complete the flattening. The collapsing takes place against the force exserted by the internal air pressure within the tube which presses the tube against the frame members of the collapsing frame.

U.S. Pat. No. 4,533,309 (Planeta) issued Aug. 6, 1985, teaches a collapsing frame having mounted thereon for engagement with the tube a plurality of parallel roller assemblies mounted for free rotation about respective parallel axes that are perpendicular to the direction of tube movement, each roller assembly comprising a plurality of independently rotatable rollers, each providing a surface having a low coefficient of friction with the material of the tube, mounted side-by-side with one another to provide a substantially continuous surface of engagement with the tube, said independently rotatable rollers constituting means effective to permit different parts of the tube in contact with the same roller assembly to have different speeds in the direction of movement of the tube. This prior patent is hereby incorporated herein by reference.

Although the collapsing frame described in the above patent was a substantial improvement in prior collapsing frames for minimizing wrinkling of the tube during flattening, some tubes collapsed by the frames such as those described in the above patent are not as sufficiently wrinkle free as is desired.

It is therefore an object of the present invention to provide an improved collapsing frame which will further minimizes wrinkling when a tube of thin plastic material is collapsed.

SUMMARY OF INVENTION

According to the present invention, each frame member has mounted thereon for engagement by the tube a series of longitudinally spaced roller assemblies mounted for free rotation about axes substantially transverse to the direction of movement of the tube, each roller assembly comprising at least one rotatable roller having a peripheral surface oriented to move the tube at an outwardly inclined angle to the direction of movement of the tube.

The rollers may have a helically contoured surface to tend to move the tube at the outwardly inclined angle. Alternatively or additionally, the rollers may be mounted on an axle which extends in the direction substantially transverse and rearwardly inclined to the direction of movement of the tube.

BRIEF DESCRIPTION OF THE DRAWINGS

Embodiments of the invention will now be described, by way of example, with reference to the accompanying drawings, of which

DESCRIPTION OF THE PREFERRED EMBODIMENTS

Figure 1:
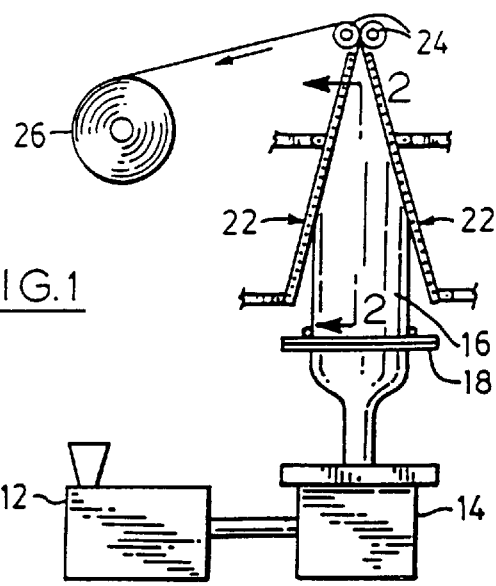
FIG. 1 is a diagrammatic side view of an installation for manufacturing thin plastic film in a tubular form and showing use of a collapsing frame.

Referring to the drawings, FIG. 1 shows an installation for manufacturing thin plastic film in tubular form. Plastic material, usually in pellet form, is fed to an extruder 12 from which molten plastic material is extruded and fed to a die assembly 14 which has a circular annular orifice (not shown) in which the plastic material emerges in the form of an outwardly moving tube 16 of circular cross section. The tube 16 is cooled by air from a surrounding air ring 18 and at the same time air is fed to the interior of the tube 16 at a pressure sufficiently high to cause the tube to increase in diameter and become thinner. The maximum diameter of the expanded tube 16 is determined by the internal air pressure and also by a sizing frame surrounding the tube.

The molten plastic forming the upwardly moving tube solidifies, and the tube is then progressively collapsed to the required flattened form by a collapsing frame comprising a pair of flat rectangular frame members 22 mounted on diametrically opposite sides of the tube 16 so that they converge towards each other in the direction of movement of the tube 16. The frame members 22 are contacted by the moving tube 16 which is progressively flattened thereby and fed between two drive rollers 24 which complete the collapsing and flattening of the tube 16. The collapsed flattened tube 16 is then wound onto a storage roller 26.

Figure 2:
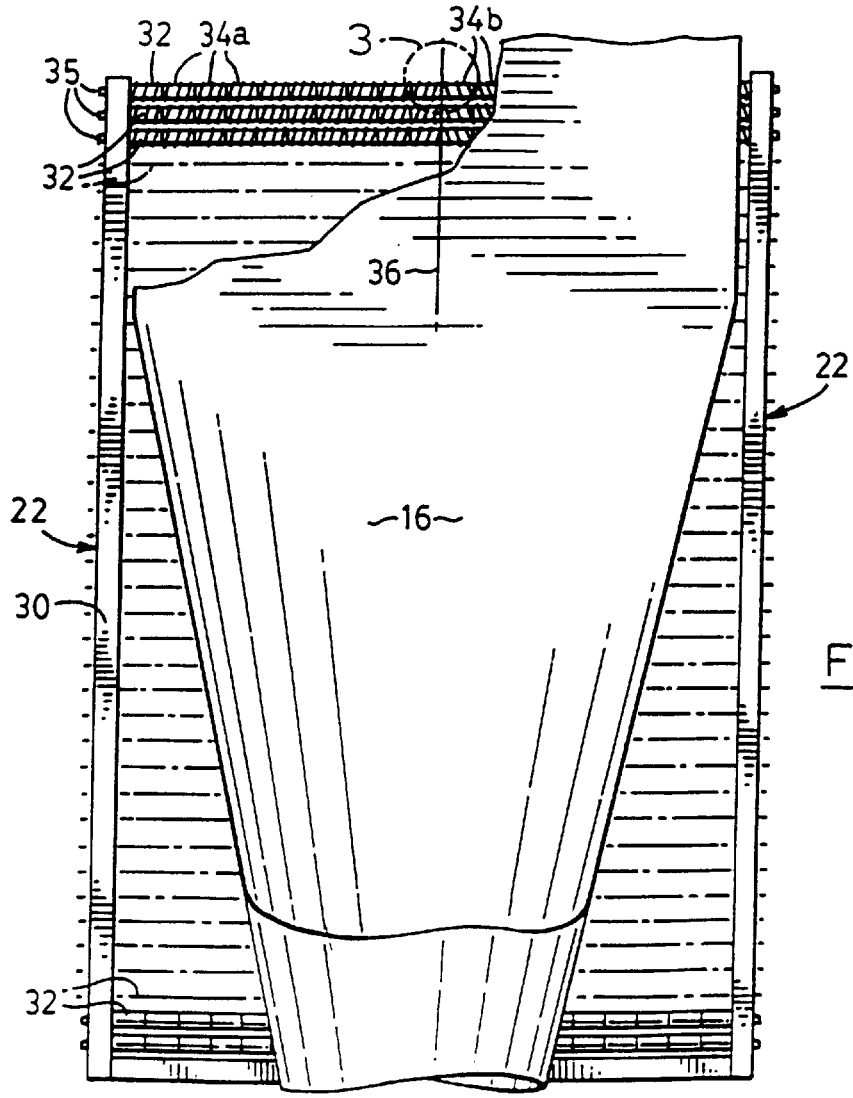
FIG. 2 is a front view, partially broken away, of a collapsing frame member in accordance with one embodiment of the invention (for clarity of the majority of the roller assemblies have been indicated by chain-dotted lines)

FIG. 2 shows a collapsing frame member 22 in accordance with one embodiment of the invention. The frame member 22 has a rectangular frame 30 having mounted thereon a series of longitudinally spaced roller assemblies 32 mounted for free rotation about axes perpendicular to the direction of the movement of the tube 16.

Figure 3:
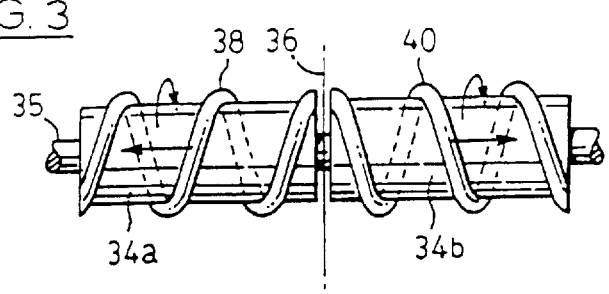
FIG. 3 is a front view of an enlarged scale of the central portion of a roller assembly indicated by the circle 3 in FIG. 2.

Each roller assembly 32 has a series of independently rotatable rollers 34a, 34b, rotating on a common axle 35 extending perpendicularly to the direction of the movement of the tube 16. As shown more clearly in FIG. 3 the rollers 34a on the left hand side of the longitudinal centre line 36 of the frame member 22 have a raised helically contoured peripheral surface 38 which tends to move the tube 16 at an outwardly inclined angle to the longitudinal centre line 36 as the tube 16 moves upwardly over the frame members 22.

Similarly, the rollers 34b on the right hand side of the longitudinal centre line 36 have a raised helically contoured peripheral surface 40 which tends to move the tube 16 at an outwardly inclined angle to the longitudinal centre line 36 as the tube 16 moves upwardly over the frame members 22.

It has been found that the above arrangement reduces the tendency of the tube 16 to become wrinkled as it is flattened by the collapsing frame member 22.

Figure 4:
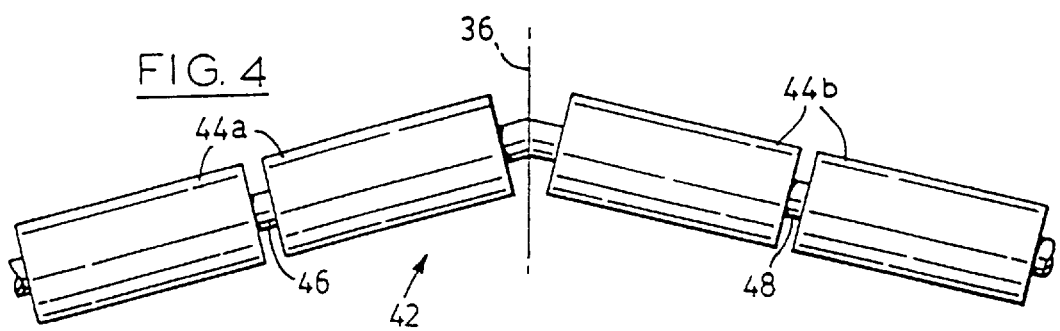
FIG. 4 is a similar view of a roller assembly in accordance with a further embodiment of the invention.

FIG. 4 shows an alternative arrangement. Each roller assembly 42 comprises rollers 44*a*, 44*b* with cylindrical peripheral surfaces. The rollers 44*a* on the left hand side of the longitudinal centre line 36 are mounted on axles 46 which are substantially transverse to but rearwardly inclined to the direction of travel of the tube 16. Similarly, rollers 44*b* on the right hand side of the longitudinal centra line 36 are mounted on axles 48 which are substantially transverse but rearwardly inclined to the direction of movement of the tube 16. This arrangement also reduces the tendency of the tube 16 to become wrinkled as it is flattened by the collapsing frame member 22.

Figure 5:
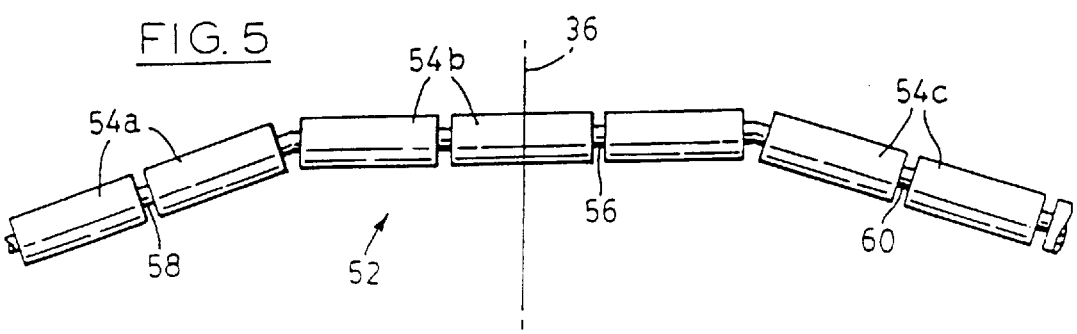
FIG. 5 is a similar view (on a smaller scale) of a still further embodiment.

FIG. 5 shows another alternative arrangement. Each roller assembly 52 comprises rollers 54*a*, 54*b*, 54*c* with cylindrical peripheral surfaces. The central rollers 54*a* in the medial area, i.e. immediately adjacent and on both sides of the longitudinal centre line 36, are mounted on central axles 56 which extend perpendicularly to the direction of movement of the tube 16. The left hand side rollers a are mounted on axle 58 which extend from the left hand ends of the central axles 56 in a rearwardly inclined direction, and the right hand rollers c are mounted on axles 60 which extend from the right hand ends of the central axles 56 in a rearwardly inclined direction. This arrangement also reduces the tendency of the tube 16 to become wrinkled as it is flattened by the collapsing frames members 22.

The rollers 44*a*, 44*b* of FIG. 4 and the rollers 54*a*, 54*b*, 54*c* of FIG. 5 may be provided with raised helically contoured peripheral surfaces as in FIG. 1 if desired.

Preferable the rollers are of diameter in the range 12.5 mm to 25 mm and are of length in the range of 12 mm to 5 cm.

Other embodiments of the invention will be readily apparent to a person skilled in the art, the scope of the invention being defined by the appended claims.

I claim:

1. A collapsing frame for collapsing a moving tube of plastic material from a circular cross section to a flattened form, said frame comprising;

a pair of frame members positionable on diametrically opposite sides of the tube to converge towards each other in the direction of movement of the tube so as to collapse the tube by engagement of the tube therewith;

each frame member having mounted thereon for engagement by the tube a series of longitudinally spaced roller assemblies mounted for free rotation about axes substantially transverse to the direction of movement of the tube;

each roller assembly comprising a series of independently rotatable rollers each having a peripheral surface oriented to tend to move the tube at an outwardly inclined angle to the direction of movement of the tube, and each roller having a diameter in the range of 12.5 mm to 25 mm and a length in the range of 12 mm to 5 cm, said rollers being mounted on axles which extend from a longitudinal centre line in opposed directions substantially transverse and rearwardly inclined to the direction of movement of the tube to tend to move the tube at an outwardly inclined angle to the direction of movement of the tube.

2. A collapsing frame for collapsing a moving tube of plastic material from a circular cross section to a flattened form, said frame comprising;

a pair of frame members positionable on diametrically opposite sides of the tube to converge towards each other in the direction of movement of the tube so as to collapse the tube by engagement of the tube therewith;

each frame member having mounted thereon for engagement by the tube a series of longitudinally spaced roller assemblies mounted for free rotation about axes substantially transverse to the direction of movement of the tube;

each roller assembly comprising a series of independently rotatable rollers each having a peripheral surface oriented to tend to move the tube at an outwardly inclined angle to the direction of movement of the tube, and each roller having a diameter in the range of 12.5 mm to 25 mm and a length in the range of 12 mm to 5 cm, central rollers in a medial area being mounted on axles which extend perpendicularly to the direction of movement of the tube, with side rollers on each side of the central rollers, said side rollers being mounted on axles which extend in opposite directions substantially transverse and rearwardly inclined to the direction of movement of the tube to tend to move the tube at an outwardly inclined angle to the direction of movement of the tube.

* * * * *